United States Patent [19]

Kerfoot

[11] 4,132,667
[45] Jan. 2, 1979

[54] CORROSION INHIBITING MOLYBDATE PIGMENT AND PREPARATION THEREOF

[75] Inventor: Derek G. E. Kerfoot, Great Missenden, England

[73] Assignee: Noranda Mines Limited, Toronto, Canada

[21] Appl. No.: 839,564

[22] Filed: Oct. 5, 1977

[30] Foreign Application Priority Data

Apr. 4, 1977 [CA] Canada .................................. 275423

[51] Int. Cl.$^2$ .......................... C09D 5/08; C23F 11/18
[52] U.S. Cl. .................................. 252/387; 106/14.21; 106/292; 423/61
[58] Field of Search ..................... 252/387; 21/2.5 R; 106/14.21, 14.25, 14.39, 292; 423/61

[56] References Cited

U.S. PATENT DOCUMENTS

| | | | |
|---|---|---|---|
| 3,353,979 | 11/1967 | Hunn ..................................... | 106/292 |
| 3,677,783 | 7/1972 | Kirkpatrick et al. ................ | 106/292 |
| 3,726,694 | 4/1973 | Moore et al. ....................... | 106/14.21 |
| 4,017,315 | 4/1977 | Vukasovich ........................ | 252/387 |
| 4,040,842 | 8/1977 | Makishima .......................... | 252/387 |

Primary Examiner—Benjamin R. Padgett
Assistant Examiner—Irwin Gluck
Attorney, Agent, or Firm—Finnegan, Henderson, Farabow & Garrett

[57] ABSTRACT

A novel group of corrosion inhibiting pigments has been discovered, which is based on zinc molybdate compounds selected from sodium zinc molybdate, potassium zinc molybdate, ammonium zinc molybdate and mixtures thereof, combined with a suitable carrier, so that the proportion of the zinc molybdate compound is such that the Mo content in the pigment is between about 1 and 30% by weight. Such pigments can be prepared in situ by several methods, such as a double decomposition reaction of sodium, potassium or ammonium molybdate and a solution containing dissolved zinc ion, or an addition of an appropriate acid to zinc oxide dispersed in sodium, potassium or ammonium molybdate solution, or an addition of zinc oxide to a solution which comprises molybdic oxide dissolved in an aqueous solution of sodium, potassium or ammonium molybdate. All these methods are simple, economic and lead to non-toxic pigments of essentially white colour, which have anti-corrosive properties comparable to, or better than, those of zinc yellow and other commercially available corrosion inhibiting pigments.

23 Claims, No Drawings

CORROSION INHIBITING MOLYBDATE PIGMENT AND PREPARATION THEREOF

This invention relates to new corrosion inhibiting pigments based on zinc molybdate compounds and to methods of preparation of such pigments.

One of the most common corrosion inhibiting pigments presently on the market is zinc yellow which has the formula 4ZnCrO$_4$.K$_2$O.3H$_2$O. This pigment, in spite of its good corrosion inhibiting properties, has important disadvantages, namely its yellow colour and its toxicity. Thus, although zinc yellow is still being used on a large scale, its limitations are obvious and many attempts have been made to replace this pigment by another which would have no such disadvantages.

In particular, there has been a great deal of interest in the corrosion inhibiting molybdate pigments and several patents have recently issued disclosing and claiming such pigments. Thus, U.S. Pat. No. 3,353,979 of Nov. 21, 1967 to Hunn discloses hydrated molybdated zinc oxide pigments of the general formula 2ZnO.MoO$_3$.XH$_2$O. U.S. Pat. No. 3,677,783 of July 18, 1972 to Kirkpatrick et al. discloses molybdated zinc oxide pigments of the general formula 2ZnO:MoO$_3$. U.S. Pat. No. 3,726,694 of Apr. 10, 1973 to Moore et al. discloses pigments based on zinc molybdate (ZnMoO$_4$), calcium molybdate (CaMoO$_4$), as well as strontium molybdate and barium molybdate.

In spite of all these attempts, the molybdate pigments have not achieved widespread acceptance in the industry, most probably because their anti-corrosive properties are not as good as those, for example, of zinc yellow, while the cost is higher.

It has now been surprisingly found that there is another group of molybdate compounds which, when combined with a suitable carrier or substrate, produces corrosion inhibiting pigments with properties as good as, or better than, those of zinc yellow but without the disadvantages of zinc yellow. These new pigments can be prepared by simple and efficient methods, so that their cost of production remains comparable to the cost of zinc yellow.

The new pigments are white in colour and non toxic. They are based on triple salts of molybdenum, namely sodium zinc molybdate (4ZnMoO$_4$.Na$_2$O.3H$_2$O or Na$_2$MoO$_4$.3ZnMoO$_4$.ZnO.3H$_2$O), potassium zinc molybdate (4ZnMoO$_4$.K$_2$O.3H$_2$O or K$_2$MoO$_4$.3ZnMoO$_4$.ZnO.3H$_2$O) or ammonium zinc molybdate (4ZnMoO$_4$.(NH$_4$)$_2$O.3H$_2$O or (NH$_4$)$_2$MoO$_4$.3ZnMoO$_4$.ZnO.3H$_2$O). The pigments are formed by combining these compounds or mixtures thereof, preferably in situ, with a suitable carrier or substrate in such a way that the Mo content in the pigment is between 1 and 30% by weight, preferably between about 5 and 15% by weight. Conventional carriers, such as titanium dioxide, calcium carbonate, talc, mica and the like, are quite suitable; however, clacium carbonate should be incorporated physically, because in situ it may react with the molybdenum to form calcium molybdate rather than sodium zinc molybdate, potassium zinc molybdate or ammonium zinc molybdate. The preferred carrier has been found to be zinc oxide. Advantageously, the carrier in accordance with this invention is used in the form of discrete particles of an average particle size of up to 30μ, preferably 1μ to 25μ.

The formulae by which the molybdate compounds according to this invention have been identified are empirical in nature and, for this reason, more than one formula has been given above. This is due to the fact that the applicant has not yet determined the exact crystal structure of these compounds; however, the chemical nature of the compounds has been clearly confirmed by chemical analysis.

The zinc molybdate compounds on which the novel pigments are based and, in fact, the pigments themselves, can be readily prepared by several simple and efficient processes which form part of the present invention.

Thus, sodium zinc molybdate, for example, can be prepared by the double decomposition reaction of sodium molybdate and a solution containing dissolved zinc ion, such as zinc nitrate solution, essentially in accordance with the following equation:

$$4Na_2MoO_4 + 4Zn(NO_3)_2 \rightarrow 4ZnMoO_4.Na_2O.3H_2O + 6NaNO_3 + 2HNO_3 \tag{1}$$

A solution of sodium molybdate for this reaction may be readily prepared by dissolving technical grade molybdic oxide in sodium hydroxide solution and filtering off the insoluble impurities. This technique has the advantage of using technical grade molybdic oxide, which is considerably less costly than the high purity molybdic oxide which has been used up till now in most known zinc molybdate pigments, thereby considerably increasing their cost.

The obtained sodium zinc molybdate has a definite X-ray diffraction pattern which is clearly different from the X-ray diffraction patterns of normal zinc molybdate or basic zinc molybdate. Furthermore, the compound can be calcined, preferably at about 600° C., to give a compound with a different diffraction pattern, which is believed to be an anhydrous sodium zinc molybdate.

The following Table 1 gives a comparison between the X-ray diffraction patterns of the various compounds:

TABLE I

| X-RAY DIFFRACTION PEAKS | | | | | | |
|---|---|---|---|---|---|---|
| Normal Zinc Molybadate, ZnMoO$_4$.H$_2$O[(1)] | | Basic Zinc Molybdate, 2ZnO.MoO$_3$.H$_2$O[(2)] | | Sodium zinc molybdate Na$_2$O.4ZnMoO$_4$.3H$_2$O[(3)] 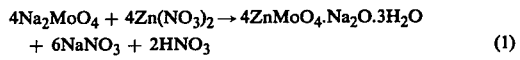 | | |
| | | | | Uncalcined | | Calcined |
| dA | I | dA | I | dA | I | dA | I |
| 9.11 | TF* | 9.70 | 24 | 5.04 | 88 | | |
| 6.65 | TF | 4.83 | 33 | 3.52 | 100 | 3.42 | 54 |
| 3.34 | TF | 2.69 | 100 | 3.26 | 87 | 3.30 | 75 |
| 3.27 | TF | 2.29 | 27 | 2.60 | 74 | 3.27 | 40 |
| 1.73 | TF | 2.18 | 22 | 3.04 | 72 | 3.22 | 100 |
| | | 1.65 | 15 | | | | |
| | | 1.58 | 43 | | | | |
| | | 1.51 | 20 | | | | |

[(1)]Data taken from Meullemeestre, J. and Penigault, E., Bull. Soc. Chim. Fr. 868 (1972).
[(2)]Data taken from U.S. Pat. No. 3,353,979.
[(3)]Data obtained by measurement for the compound obtained according to this invention.
*Relative intensities not quoted in (1); TF means high intensity.

In practice, the corrosion inhibiting pigment may be prepared in situ by precipitating sodium zinc molybdate from solution onto the surface of substrate particles, which may consist of zinc oxide or some other inert pigment material known in the art, such as titanium dioxide, talc, mica or mixtures thereof.

In the preferred method of preparation, the substrate particles are initially dispersed in a solution of sodium molybdate in order to wet the particle surface and at least a stoichiometric amount of a solution containing dissolved zinc ion, such as zinc nitrate solution, is then added to the stirred slurry, to precipitate sodium zinc molybdate on the particle surface. The pigment is then removed by filtration and dried and may be calcined, preferably at about 600° C. The sodium zinc molybdate present in the final pigment is adjusted so as to give a Mo content of between about 1 and 30% by weight, preferably 5 to 15% by weight, which provides excellent anti-corrosive properties.

Another method by which sodium zinc molybdate can be prepared is summarized by the following equation:

$$4ZnO + 4Na_2MoO_4 + 6HNO_3 \rightarrow$$
$$4ZnMoO_4 \cdot Na_2O \cdot 3H_2O + 6NaNO_3 \quad (2)$$

This method is based on the complex stoichiometry of sodium zinc molybdate. As is apparent from Equation (2), sodium zinc molybdate can be formed in partially reacting zinc oxide with an acid such as nitric acid, in the presence of sodium molybdate. Instead of nitric acid, other acids, such as hydrochloric or sulphuric acids, can be employed in a similar manner.

In the preparation of the pigment, the object is to deposit sodium zinc molybdate on the surface of a suitable substrate or carrier, e.g. zinc oxide. In practice, this is achieved by suspending a suitable excess of zinc oxide in an aqueous solution of sodium molybdate, stirring for sufficient time for the solid particles to be fully wetted by the aqueous solution and adding a predetermined volume of an acid, such as nitric acid to the solution to cause the precipitation of sodium zinc molybdate on the surface of the zinc oxide particles. Since the zinc oxide is present in excess, the significant parameter is the molar ratio of $H^+$ in the acid, e.g. nitric acid, to sodium molybdate, which, theoretically, according to Equation (2) should be 1.5 for the formation of sodium zinc molybdate $4ZnMoO_4 \cdot Na_2O \cdot 3H_2O$. If this molar ratio is increased to 2, normal zinc molybdate, $ZnMoO_4 \cdot H_2O$, will be formed according to the following equation:

$$ZnO + Na_2MoO_4 + 2HNO_3 \rightarrow ZnMoO_4 \cdot H_2O +$$
$$2NaNO_3 \quad (3)$$

If additional alkalies, such as NaOH, are present in the initial solution, extra acid may be required to neutralize the same and the ratio to produce sodium zinc molybdate may then be higher than 1.5.

Still another method of preparing sodium zinc molybdate can be defined by the following equation:

$$Na_2MoO_4 + 3MoO_3 + 3H_2O + 4ZnO \rightarrow$$
$$4ZnMoO_4 \cdot Na_2O \cdot 3H_2O. \quad (4)$$

This method is based on the observation that molybdic oxide is considerably more soluble in a solution of sodium molybdate (~ 100 gpl Mo) than in water (1–15 gpl Mo). The increased solubility may be due to the formation in solution of a polymeric anion, such as tetramolybdate, although the existence of such a species in aqueous solution systems has not been definitely established. It seemed probable, therefore, that if zinc oxide were to be added to such a solution, precipitation of sodium zinc molybdate on the surface of the solid would occur. A test showed that this did, in fact, happen and a pigment containing about 30% Mo was obtained. X-ray diffraction analysis indicated that the molybdenum was present in the form of sodium zinc molybdate, $4ZnMoO_4 \cdot Na_2O \cdot 3H_2O$.

A series of tests was subsequently carried out to determine the optimum conditions for the formation of a sodium zinc molybdate pigment by this technique. The tests were designed to show the effect of variations in the molybdenum/sodium molar ratio in the aqueous solution, on the nature of the zinc molybdate coating formed on the zinc oxide substrate when an excess of zinc oxide was stirred into the solution of molybdic oxide and sodium molybdate. The molybdenumbearing solutions were prepared by dissolving pure molybdic oxide in sodium hydroxide solution, and also by dissolving pure molybdic oxide in sodium molybdate solution, to yield solutions which were approximately 1M in molybdenum. The solutions were filtered to remove any undissolved molybdic oxide, before the slurry of zinc oxide was added. The weights of the reagents were calculated to yield a pigment containing 9 - 13% Mo and 1 - 1.5% Na.

The test parameters and the characteristics of the resulting pigment products are summarized in Table II:

Table II

| Test No. | Reagents in Solution | Mo/Na Ratio in Solution | Product Characteristics | | | | | |
|---|---|---|---|---|---|---|---|---|
| | | | Zn % | Mo % | Na % | Mo/Na Ratio | XRD Identification | |
| | | | | | | | Major | Minor |
| 1 | NaOH | 2.0 | 66.1 | 8.4 | 0.80 | 2.52 | ZnO | $ZnMoO_4 \cdot H_2O + Na_2O \cdot 4ZnMoO_4 \cdot 3H_2O$ |
| 2 | + | 1.5 | 66.1 | 8.9 | 1.04 | 2.05 | ZnO | $ZnMoO_4 \cdot H_2O + Na_2O \cdot 4ZnMoO_4 \cdot 3H_2O$ |
| 3 | $MoO_3$ | 1.0 | 64.5 | 9.6 | 1.29 | 1.78 | ZnO | $Na_2O \cdot 4ZnMoO_4 \cdot 3H_2O$ |

The reaction under the optimum conditions for sodium zinc molybdate formation can be represented by the following equation:

$$2Na_2MoO_4 + 2MoO_3 + 4ZnO + 4H_2O \rightarrow$$
$$4ZnMoO_4 \cdot Na_2O \cdot 3H_2O + 2NaOH \quad (5)$$

This method of preparation has an important advantage over alternative methods in that no potentially corrosive anions, such as nitrate, are introduced into the system and there is thus less risk of contamination of the pigment.

If, instead of sodium zinc molybdate, it is desired to obtain potassium zinc molybdate or ammonium zinc molybdate, or pigments based thereon, the above methods equally apply and these new compounds can be readily prepared by merely replacing sodium molybdate in the above equations by potassium molybdate or ammonium molybdate respectively. Furthermore, the excess of zinc oxide used in the last two methods of preparation can be replaced by another suitable particulate carrier, such as those already disclosed above.

The invention will now further be illustrated by means of the following non-limitative examples:

EXAMPLE 1

Pure Sodium Zinc Molybdate ($4Na_2MoO_4 + 4Zn(NO_3)_2$)

Zinc nitrate (118.99 g., 0.4 mole) was stirred into 300 ml. of water and added slowly to a 200 ml. sodium molybdate solution (82.38 g., 0.4 mole) and the resulting slurry was heated to 80° C. for one hour. The slurry was filtered and the solid product was washed with 1,000 ml. of water to remove entrained sodium nitrate and nitric acid. The product was dried in air at 110° C.

Chemical analysis of the product showed a molybdenum content of 36.4%, a zinc content of 24.8% and a sodium content of 4.3%, the balance being oxygen associated with Mo, Zn and Na as well as water of hydration. The X-ray diffraction pattern of the product was the same as that given in Table I, column 3, for the uncalcined product.

On the basis of the analytical data, the product obtained in this example is pure sodium zinc molybdate.

EXAMPLE 2

Pure Sodium Zinc Molybdate (4ZnO + 4Na$_2$MoO$_4$ + 6HNO$_3$)

Zinc oxide (32.55 g., 0.4 mole) was stirred into a solution of sodium molybdate (82.38 g., 0.4 mole) in 250 ml. of water. A solution of nitric acid (37.8 g., 0.6 mole) in 200 ml. of water was added slowly to the molybdate solution and the resulting slurry was heated to 80° C. for one hour. The slurry was filtered and the solid product was washed with 1,000 ml. of water to remove entrained sodium nitrate. The product was dried in air at 110° C. Chemical analysis of the product showed a molybdenum content of 37.0%, a zinc content of 24.5% and a sodium content of 4.25%, the balance being oxygen associated with Mo, Zn and Na, as well as water of hydration. The X-ray diffraction pattern and other properties were the same as those of Example 1.

EXAMPLE 3

Pure Sodium Zinc Molybdate (2MoO$_3$ + 2Na$_2$MoO$_4$ + 4ZnO)

Molybdenum trioxide (28.8 g., 0.2 mole) was dissolved in a 500 ml. solution of sodium molybdate (41.19 g., 0.2 mole) and zinc oxide (32.55 g., 0.4 mole) was stirred into this solution, and the resulting slurry was heated to 80° C. for 1 hour. The slurry was filtered and washed with 1,000 ml. of water to remove entrained sodium hydroxide. The product was dried in air at 110° C. Chemical analysis of the product showed a molybdenum content of 35.0%, a zinc content of 26.6% and a sodium content of 3.9%, the balance being oxygen associated with Mo, Zn and Na as well as water of hydration. The X-ray diffraction pattern and other properties were the same as those of Example 1.

EXAMPLE 4

Pure Sodium Zinc Molybdate (3MoO$_3$ + Na$_2$MoO$_4$ + 4ZnO)

Molybdenum trioxide (43.18 g., 0.3 mole) was dissolved in a 500 ml. solution of sodium molybdate (20.6 g., 0.1 mole) and zinc oxide (32.55 g., 0.4 mole) was stirred into this solution, and the resulting slurry was heated to 80° C. for one hour. The slurry was filtered and washed with 1,000 ml. of water to remove entrained sodium hydroxide. The product was dried in air at 110° C. Chemical analysis of the product showed a molybdenum content of 35.0%, a zinc content of 26.6% and a sodium content of 3.9%, the balance being oxygen associated with Mo, Zn and Na as well as water of hydration. The X-ray diffraction pattern and other properties were the same as those of Example 1.

EXAMPLE 5

Pure Potassium Zinc Molybdate (4ZnO + 4K$_2$MoO$_4$ + 6HNO$_3$)

Zinc oxide (32.55 g., 0.4 mole) was stirred into a solution of potassium molybdate (95.26 g., 0.4 mole) in 250 ml. of water. A solution of nitric acid (37.8 g., 0.6 mole) in 200 ml. of water was added slowly to the molybdate solution and the resulting slurry was heated to 80° C. for 1 hour. The slurry was filtered and the solid product was washed with 1,000 ml. of water to remove entrained potassium nitrate. The product was dried in air at 110° C. Chemical analysis of the product showed a molybdenum content of 35.9%, a zinc content of 23.74% and a potassium content of 7.04%, the balance being oxygen associated with Mo, Zn and K as well as water of hydration. On the basis of the analytical data, the product obtained in this example is pure potassium zinc molybdate.

EXAMPLE 6

Pure Potassium Zinc Molybdate (2MoO$_3$ + 2K$_2$MoO$_4$ + 4ZnO)

Molybdenum trioxide (28.8 g., 0.2 mole) was dissolved in a 500 ml. solution of potassium molybdate (47.63 g., 0.2 mole) and zinc oxide (32.55 g., 0.4 mole) was stirred into this solution, and the resulting slurry was heated to 80° C. for one hour. The slurry was filtered and the solid product was washed with 1,000 ml. of water to remove entrained sodium hydroxide. The product was dried in air at 110° C. On the basis of analytical data, the product was shown to be pure potassium zinc molybdate.

EXAMPLE 7

Pure Potassium Zinc Molybdate (3MoO$_3$ + K$_2$MoO$_4$ + 4ZnO)

Molybdenum trioxide (43.18 g., 0.3 mole) was dissolved in a 500 ml. solution of potassium molybdate (23.8 g., 0.1 mole) and zinc oxide (32.55 g., 0.4 mole) was stirred into this solution, and the resulting slurry was heated to 80° C. for one hour. The slurry was filtered and the solid product was dried in air at 110° C. On the basis of analytical data, the product was found to be pure potassium zinc molybdate.

EXAMPLE 8

Pure Potassium Zinc Molybdate (4K$_2$MoO$_4$ + 4Zn(NO$_3$)$_2$)

Zinc nitrate (118.99 g., 0.4 mole) was dissolved in 300 ml. of water and added slowly to a 200 ml. solution of potassium molybdate (95.26 g., 0.4 mole) and the resulting slurry was heated to 80° C. for one hour. The slurry was filtered and the solid product was washed with 1,000 ml. of water to remove entrained potassium nitrate and nitric cid. The product was dried in air at 110° C. On the basis of analytical data, the product was found to be pure potassium zinc molybdate having a Mo content of 37.3%, a Zn content of 28.1% and a K content of 7.73%, the balance being oxygen associated with these elements as well as water of hydration.

EXAMPLE 9

Pure Ammonium Zinc Molybdate (4ZnO + 4(NH$_4$)$_2$MoO$_4$ + 6HNO$_3$)

Zinc oxide (32.55 g., 0.4 mole) was stirred into a solution of ammonium molybdate (78.38 g., 0.4 mole) in 250 ml. of water. A solution of nitric acid (37.8 g., 0.6 mole) in 200 ml. of water was added slowly to the molybdate solution and the resulting slurry was heated to 80° C. for one hour. The slurry was filtered and the solid product was washed with 1,000 ml. of water to remove entrained sodium nitrate. The product was dried in air at 110° C. Chemical analysis of the product showed a Mo content of 37.2%, a Zn content of 26.1% and a NH$_4^+$ content of 6.3%, the balance being oxygen and water of hydration. On the basis of analytical data, this product was found to be pure ammonium zinc molybdate.

EXAMPLE 10

Pure Ammonium Zinc Molybdate (2MoO$_3$ + 2(NH$_4$)$_2$MoO$_4$ + 4ZnO)

Molybdenum trioxide (28.8 g., 0.2 mole) was dissolved in a 500 ml. solution of ammonium molybdate (39.19 g., 0.2 mole) and zinc oxide (32.55 g., 0.4 mole) was stirred into this solution and the resulting slurry was heated to 80° C. for one hour. The slurry was filtered and the solid product was washed with 1,000 ml. of water to remove entrained sodium nitrate. The product was dried in air at 110° C. Chemical analysis of the product showed a Mo content of 37.5%, a Zn content of 26.1% and a NH$_4^+$ content of 3.4%, the balance being oxygen and water of hydration. On the basis of analytical data, this product was found to be pure ammonium zinc molybdate.

EXAMPLE 11

Pure Ammonium Zinc Molybdate (3MoO$_3$ + (NH$_4$)$_2$MoO$_4$ + 4ZnO)

Molybdenum trioxide (43.18 g., 0.3 mole) was dissolved in a 500 ml. solution of ammonium molybdate (19.6 g., 0.1 mole) and zinc oxide (32.55 g., 0.4 mole) was stirred into this solution and the resulting slurry was heated to 80° C. for 1 hour. The slurry was filtered and the solid product was washed with 1,000 ml. of water to remove entrained sodium nitrate. The product was dried in air at 110° C. Chemical analysis of the product showed a Mo content of 37.6%, a Zn content of 26.1% and a NH$_4^+$ content of 3.4%, the balance being oxygen and water of hydration. On the basis of analytical data, the product was found to be pure ammonium zinc molybdate.

EXAMPLE 12

Pure Ammonium Zinc Molybdate (4(NH$_4$)$_2$MoO$_4$ + 4Zn(NO$_3$)$_2$)

Zinc nitrate (118.99 g., 0.4 mole) was stirred into 300 ml. of water and added slowly to a 200 ml. solution of ammonium molybdate (78.38 g., 0.4 mole). The slurry was filtered and the solid product was washed with 1,000 ml. of water to remove entrained sodium nitrate. The product was dried in air at 110° C. Chemical analysis of the product showed a Mo content of 37.2%, a Zn content of 24.1% and a NH$_4^+$ content of 6.3%, the balance being oxygen and water of hydration. On the basis of analytical data, the product was found to be pure ammonium zinc molybdate.

EXAMPLE 13

Sodium Zinc Molybdate Pigment (5Na$_2$MoO$_4$ + 74ZnO + 5Zn(NO$_3$)$_2$·6H$_2$O)

Sodium molybdate (12.5 g., 0.05 mole) was dissolved in 125 ml. of water. Zinc oxide (60 g., 0.74 mole) was added to the solution and the slurry was stirred for one hour. Zinc nitrate (15 g., 0.05 mole) in 75 ml. water was slowly added to the slurry, and the mixture was heated to 90° C. for 30 minutes. The solid product (72.7 g.) was filtered off, washed and dried at 110° C.

The X-ray diffraction pattern of the dried product showed the presence of zinc oxide and the sodium zinc molybdate characterized by the data listed in Table I, column 3. After calcining at 600° C., the X-ray diffraction pattern of the product showed the presence of zinc oxide and the basic sodium zinc molybdate characterized by the data listed in Table I, column 4. This example indicates that zinc oxide substrate particles can be coated with the sodium zinc molybdate in situ.

EXAMPLE 14

The procedure described in Example 13 was repeated with titanium dioxide (60 g.) in place of zinc oxide. The X-ray diffraction pattern of the product (69.1 g.) showed the presence of titanium dioxide and the sodium zinc molybdate characterized by the data listed in Table I, column 3, suggesting that a titanium dioxide substrate can be coated with the sodium zinc molybdate by this technique.

EXAMPLE 15

Sodium Zinc Molybdate Pigment (58.87 ZnO + 4Na$_2$MoO$_4$ + 6HNO$_3$)

Zinc oxide (479 g., 5.89 mole) was stirred into a solution of sodium molybdate (82.38 g., 0.4 mole) in 1,000 ml. of water. A solution of nitric acid (37.8 g., 0.6 mole) in 500 ml. of water was added slowly to the molybdate solution and the resulting slurry was heated to 80° C. for one hour. The slurry was filtered and the solid product was washed with 2,000 ml. of water to remove entrained sodium nitrate. The product was dried in air at 110° C. The resulting product (548.3 g.) assayed 7.05% Mo, 71.3% Zn and 0.85% Na, the balance being oxygen and water of hydration.

EXAMPLE 16

Sodium Zinc Molybdate Pigment (58.87 ZnO + 1Na$_2$MoO$_4$ + 3MoO$_3$)

Molybdenum trioxide (43.18 g., 0.3 mole) was dissolved in a 1,500 ml. solution of sodium molybdate (20.6 g., 0.1 mole) and zinc oxide (479 g., 5.89 mole) was stirred into this solution, and the resulting slurry was heated to 80° C. for one hour. The slurry was filtered and the solid product was dried in air at 110° C. The resulting product (524.9 g.) assayed 5.35% Mo, 71.4% Zn and 0.71% Na, the balance being oxygen and water of hydration.

EXAMPLE 17

Sodium Zinc Molybdate Pigment (58.87 ZnO + 2Na$_2$MoO$_4$ + 2MoO$_3$)

Molybdenum trioxide (28.79 g., 0.2 mole) was dissolved in a 1,500 ml. solution of sodium molybdate (41.2 g., 0.2 mole) and zinc oxide (479 g., 5.89 mole) was stirred into this solution, and the resulting slurry was heated to 80° C. for one hour. The slurry was filtered and washed with 2,000 ml. of water to remove entrained sodium hydroxide. The product was dried in air at 110° C. The resulting product (524.8 g.) assayed 5.31% Mo, 68.5% Zn and 0.70% Na, the balance being oxygen and water of hydration.

EXAMPLE 18

Potassium Zinc Molybdate Pigment (58.45 ZnO + 4K$_2$MoO$_4$ + 6HNO$_3$)

Zinc oxide (475.67 g., 5.84 mole) was stirred into a solution of potassium molybdate (95.25 g., 0.4 mole) in 1,000 ml. of water. A solution of nitric acid (37.8 g., 0.6 mole) in 500 ml. of water was added slowly to the molybdate solution and the resulting slurry was heated to 80° C. for one hour. The slurry was filtered and the solid product was washed with 2,000 ml. of water to remove entrained potassium nitrate. The product was dried in air at 110° C. The resulting product (546.0 g.) assayed 6.97% Mo, 66.0% Zn and 1.42% K, the balance being oxygen and water of hydration.

EXAMPLE 19

Potassium Zinc Molybdate Pigment (58.45 ZnO + 2K$_2$MoO$_4$ + 2MoO$_3$)

Molybdenum trioxide (28.78 g., 0.2 mole) was dissolved in a 1,500 ml. solution of potassium molybdate (47.63 g., 0.2 mole) and zinc oxide (475.67 g., 5.84 mole) was stirred into this solution, and the resulting slurry was heated to 80° C. for one hour. The slurry was filtered and the solid product was washed with 2,000 ml. of water to remove entrained potassium hydroxide. The product was dried in air at 110° C. The resulting product (524.5 g.) assayed 5.35% Mo, 68.0% Zn and 1.20% K, the balance being oxygen and water of hydration.

EXAMPLE 20

Potassium Zinc Molybdate Pigment (58.45 ZnO + K$_2$MoO$_4$ + 3MoO$_3$)

Molybdenum trioxide (43.18 g., 0.3 mole) was dissolved in a 1,500 ml. solution of potassium molybdate (23.8 g., 0.1 mole) and zinc oxide (475.67 g., 5.84 mole) was stirred into this solution, and the resulting slurry was heated to 80° C. for one hour. The slurry was filtered and the solid product was dried in air at 110° C. The resulting product (524.5 g.) assayed 5.35% Mo, 68.0% Zn and 1.20% K, the balance being oxygen and water of hydration.

EXAMPLE 21

Potassium Zinc Molybdate Pigment (54.45 ZnO + 4K$_2$MoO$_4$ + 4Zn(NO$_3$)$_2$)

Zinc oxide (443.1 g., 5.4 mole) was stirred into a potassium molybdate solution (95.26 g., 0.4 mole) in 1,500 ml. of water. A solution of zinc nitrate (118.99 g., 0.4 mole) in 500 ml. of water was added slowly to the slurry and the resulting slurry was heated to 80° C. for one hour. The slurry was filtered and the solid product was washed with 2,000 ml. of water to remove entrained potassium nitrate and nitric acid. The product was dried in air at 110° C. The resulting product (542 g.) assayed 6.98% Mo, 64.8% Zn and 1.42% K, the balance being oxygen and water of hydration.

EXAMPLE 22

Ammonium Zinc Molybdate Pigment (57.3 ZnO + 4(NH$_4$)$_2$MoO$_4$ + 6HNO$_3$)

Zinc oxide (466.2 g., 5.7 mole) was stirred into a solution of ammonium molybdate (78.38 g., 0.4 mole) in 1,000 ml. of water. A solution of nitric acid (37.8 g., 0.6 mole) in 500 ml. of water was added slowly to the molybdate solution and the resulting slurry was heated to 80° C. for one hour. The slurry was filtered and the solid product was washed with 2,000 ml. of water to remove entrained ammonium nitrate. The product was dried in air at 110° C. The resulting product (534.7 g.) assayed 6.9% Mo, 69.0% Zn and 1.3% NH$_4^+$, the balance being oxygen and water of hydration.

EXAMPLE 23

Ammonium Zinc Molybdate Pigment (58.0 ZnO + (NH$_4$)$_2$MoO$_4$ + 3MoO$_3$)

Molybdenum trioxide (43.18g., 0.3 mole) was dissolved in a 1,500 ml. solution of ammonium molybdate (19.6 g., 0.1 mole) and zinc oxide (471.9 g., 5.8 mole) was stirred into this solution, and the resulting slurry was heated to 80° C. for one hour. The slurry was filtered and the solid product was dried in air at 110° C. The resulting product (543 g.) assayed 7.0% Mo, 68.7% Zn and 0.58% NH$_4^+$, the balance being oxygen and water of hydration.

EXAMPLE 24

Ammonium Zinc Molybdate Pigment (58.00 ZnO + 2(NH$_4$)$_2$MoO$_4$ + 2MoO$_3$)

Molybdenum trioxide (28.78 g., 0.2 mole) was dissolved in a 1,500 ml. solution of ammonium molybdate (39.2 g., 0.2 mole) and zinc oxide (471.9 g., 5.8 mole) was stirred into this solution, and the resulting slurry was heated to 80° C. for one hour. The slurry was filtered and the solid product was washed with 2,000 ml. of water to remove entrained ammonium hydroxide. The product was dried in air at 110° C. The resulting product (529.3 g.) assayed 6.90% Mo, 70.4% Zn and 0.73% NH$_4^+$, the balance being oxygen and water of hydration.

EXAMPLE 25

Ammonium Zinc Molybdate Pigment (53.3 ZnO + 4(NH$_4$)$_2$MoO$_4$ + 4Zn(NO$_3$)$_2$)

Zinc oxide (433.7 g., 5.3 mole) was stirred into an ammonium molybdate solution (78.38 g., 0.4 mole) in 1,500 ml. of water. A solution of zinc nitrate (119.0 g., 0.4 mole) in 500 ml. of water was added slowly to the slurry and the resulting slurry was heated to 80° C. for one hour. The slurry was filtered and the solid product was washed with 2,000 ml. of water to remove entrained ammonium nitrate and nitric acid. The product was dried in air at 110° C. The resulting product (529.3 g.) assayed 6.91 Mo, 70.4% Zn and 1.2% NH$_4^+$, the balance being oxygen and water of hydration.

To test the corrosion inhibiting properties of the novel pigments, a number of steel panels were coated with primer formulations containing applicant's zinc molybdate pigments and some competitive products and then exposed in the salt-spray cabinet for 500 hours. All primers were formulated, on an equal cost basis with relation to zinc yellow, with a styrene-butadiene vehicle at 75% of the critical pigment volume concentration (CPVC). Each panel had a strip of exposed metal that was created by masking during the primer application. None of the panels had a top coat over the primer. The relative effectiveness of each pigment was determined by calculation of a corrosion factor, defined as the area of corrosion undercutting divided by the perimeter of the original bare metal strip. The description of the pigments tested and the corrosion factors determined for each are given in the following Table III:

TABLE III

| Panel No. | Sample | Pigment Composition | Mo % | Corrosion Factor |
|---|---|---|---|---|
| 1 | Noranda 115 | Sodium zinc molybdate | 6.75 | 1.81 |
| 2 | Noranda 117 | Sodium zinc molybdate | 13.70 | 2.06 |
| 3 | Noranda 155 | Sodium zinc molybdate | 5.31 | 2.12 |
| 4 | Noranda 158 | Potassium zinc molybdate | 6.97 | 2.49 |
| 5 | Noranda 159 | Ammonium zinc molybdate | 6.93 | 1.97 |
| 6 | Zinc yellow | Potassium zinc chromate | — | 2.07 |
| 7 | Molywhite 101 | Zinc molybdate | 14.4 | 5.99 |
| 8 | Halox CW 221 | Calcium borosilicate | — | 7.13 |
| 9 | Oncor M-50 | Basic lead silico chromate | — | 5.50 |
| 10 | Busan 11-M1 | Barium meta-borate | — | 7.55 |
| 11 | Negative Control | TiO$_2$ | — | 7.07 |

From the above Table III, it is clear that the Noranda molybdate pigments have demonstrated a corrosion inhibiting effectiveness similar to, and in many instances better than, that of zinc yellow and far superior to several other anti-corrosive pigments available on the market, such as the zinc molybdate pigment known under the trade mark "Molywhite 101," the calcium borosilicate pigment, known under the trade mark "Halox CW 221," the basic lead silico chromate pigment known under the trade mark "Oncor M-50" and the barium meta-borate pigment known under the trade mark "Busan 11-M1", and far better than the negative control sample (TiO$_2$) which is commonly used in industry for comparison purposes.

The primers prepared with the Noranda extended pigments exhibited a nice bluish-white colour and were non-toxic. All these primers were easily thinned, sprayed and dried with no significant defects being identified. It has also been found that the extended pigments, according to this invention, have superior anti-corrosive properties to those of the pure compounds.

It is obvious that the corrosion inhibiting effectiveness of the Noranda extended pigments may vary slightly depending on the Mo content, the type of compound on which the pigment is based, i.e. sodium zinc molybdate, potassium zinc molybdate or ammonium zinc molybdate or a combination of these, and, perhaps, some other factors, such as the type of substrate or carrier employed, the particle size of the pigment and the like. These factors can be adjusted by a man familiar with this art, according to his requirements. Generally, however, it is clear that the Noranda pigments have excellent anti-corrosive properties while being non-toxic and of white colour.

It is, therefore, believed that an important advance in the art of corrosion inhibiting pigments has been achieved.

What is claimed is:

1. A corrosion inhibiting pigment comprising a zinc molybdate compound selected from the group consisting of sodium zinc molybdate, potassium zinc molybdate, ammonium zinc molybdate and mixtures thereof, in combination with a suitable carrier, the proportion of the zinc molybdate compound being such that the Mo content in the pigment is between about 1 and 30% by weight.

2. A corrosion inhibiting pigment according to claim 1, in which the carrier is zinc oxide.

3. A corrosion inhibiting pigment according to claim 1, in which the carrier is titanium dioxide, calcium carbonate, talc, mica or mixtures thereof.

4. A corrosion inhibiting pigment according to claim 1, in which the Mo content is between about 5 and 15% by weight.

5. A corrosion inhibiting pigment according to claim 1, which is in calcined state.

6. A corrosion inhibiting pigment formed in situ and comprising a combination of zinc oxide particles having a surface deposit of sodium zinc molybdate, potassium zinc molybdate or ammonium zinc molybdate, with the Mo content in the pigment being between about 1 and 30% by weight.

7. A corrosion inhibiting pigment comprising discrete particles of a substrate coated with sodium zinc molybdate in a proportion such that the Mo content of the pigment is between about 1 and 30% by weight.

8. A corrosion inhibiting pigment comprising discrete particles of a substrate coated with potassium zinc molybdate in a proportion such that the Mo content of the pigment is between about 1 and 30% by weight.

9. A corrosion inhibiting pigment comprising discrete particles of a substrate coated with ammonium zinc molybdate in a proportion such that the Mo content of the pigment is between about 1 and 30% by weight.

10. A process for making a corrosion-inhibiting molybdate pigment comprising stirring a finely particulated carrier material in a solution of sodium molybdate, potassium molybdate, ammonium molybdate or mixtures thereof for sufficient time to allow the molybdate solution to wet the surface of the particles, and subsequently adding at least a stoichiometric amount of a solution containing dissolved zinc ion, in order to effect the formation of a sparingly soluble sodium, potassium or ammonium zinc molybdate salt as a deposit on the substrate particles, and recovering the solid pigment material from the solution.

11. Process as claimed in claim 10, wherein the finely particulated carrier material is selected from zinc oxide, titanium dioxide, talc, mica and mixtures thereof and has a particle size of up to about 30$\mu$.

12. Process as claimed in claim 10, wherein the solution containing dissolved zinc ion is zinc nitrate solution.

13. Process as claimed in claim 10, wherein the pigment material, after recovery from the solution, is dried and eventually calcined.

14. A process for making a corrosion-inhibiting molybdate pigment comprising stirring an excess of finely particulated zinc oxide in an aqueous solution of sodium molybdate, potassium molybdate, ammonium molybdate or mixtures thereof for sufficient time to allow the molybdate to wet the surface of the zinc oxide particles, adding a predetermined volume of an acid to the solution, such as to cause the precipitation of sodium zinc molybdate, potassium zinc molybdate or ammonium zinc molybdate on the zinc oxide particles, and recovering the solid pigment material from the solution.

15. Process as claimed in claim 14, wherein the acid is nitric acid, hydrochloric acid or sulphuric acid.

16. Process as claimed in claim 14, wherein the molar ratio of H+ in the acid, to sodium molybdate, potassium molybdate or ammonium molybdate is about 1.5.

17. Process as claimed in claim 14, wherein the finely particulate zinc oxide has a particle size of up to about 30μ.

18. Process as claimed in claim 14, wherein the pigment material, after recovery from the solution, is dried and eventually calcined.

19. Process as claimed in claim 14, wherein the excess of finely particulate zinc oxide is replaced by a suitable particulate inert carrier.

20. A process for making a corrosion-inhibiting molybdate pigment comprising stirring an excess of finely particulate zinc oxide into a solution comprising molybdic oxide dissolved in an aqueous solution of sodium molybdate, potassium molybdate, ammonium molybdate or mixtures thereof, to effect precipitation of sodium zinc molybdate, potassium zinc molybdate or ammonium zinc molybdate on the zinc oxide particles, and recovering the solid pigment material from the solution.

21. Process as claimed in claim 20, wherein the finely particulate zinc oxide has a particle size of up to about 30μ.

22. Process as claimed in claim 20, wherein the pigment material, after recovery from the solution, is dried and eventually calcined.

23. Process as claimed in claim 20, wherein the excess of finely particulate zinc oxide is replaced by a suitable particulate inert carrier.

* * * * *